June 24, 1924.

J. M. COLLINGWOOD 1,498,612

PNEUMATIC COTTON PICKING MACHINE

Filed Feb. 19, 1921

INVENTOR.

John M. Collingwood

BY

U. G. Charles ATTORNEY.

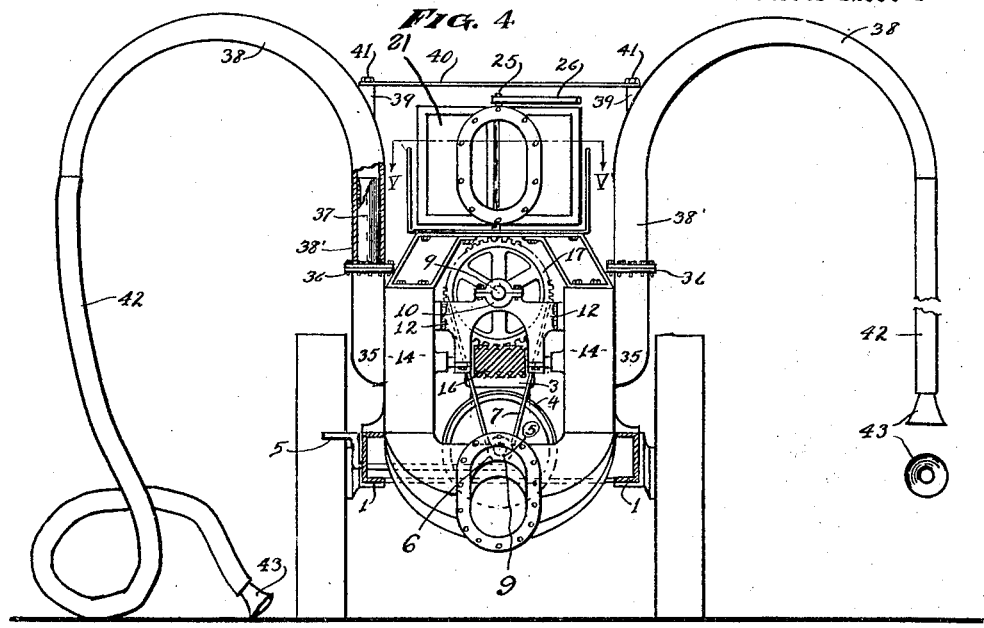

Patented June 24, 1924.

1,498,612

UNITED STATES PATENT OFFICE.

JOHN M. COLLINGWOOD, OF WICHITA, KANSAS.

PNEUMATIC COTTON-PICKING MACHINE.

Application filed February 19, 1921. Serial No. 446,425.

*To all whom it may concern:*

Be it known that I, JOHN M. COLLINGWOOD, a citizen of the United States, and resident of Wichita, in the county of Sedgwick and State of Kansas, have invented certain new and useful Improvements in Pneumatic Cotton-Picking Machines, of which the following is a specification, reference being had to the accompanying two sheets of drawing, forming a part hereof.

My invention relates to pneumatic cotton-picking implements, and has for its object to provide an implement by which cotton may be picked from the plants by a number of operatives simultaneously, by the use of suction nozzles, without the necessity of touching the cotton with the hands, and also without carrying of the bags by operatives.

Essentially, the implement comprises a plurality of blowers or exhaust fans, a motor for the same, an induction tube and picker-nozzle for each blower, a clutch and gearing for transmitting the motive power to the fans, a plurality of cotton receptacles pervious to air, and a wheeled frame upon which all these instrumentalities are conveyed.

Secondarily, the implement includes means for supporting the cotton-receptacles, means to quickly attach both receptacles to the air trunk, and a butterfly valve arranged so as to admit the air stream to either bag while excluding it from the other, whereby a continuous operation of the machine is permitted, one bag being emptied by an operative while the other bag is being filled through the air-trunk.

The implement further comprises means for quickly attaching or detaching the receptacles to or from the branched mouth of the air-trunk.

The use of this invention saves much of the time required for the old hand-picking method, since in the latter method each picker has to carry a long bag through the field and must perform hundreds of arm movements in placing the cotton in the bag; whereas by my invention all the cotton is automatically deposited in a bag and the operatives have nothing to do but handle the picker-nozzles.

A preferred embodiment of the invention is illustrated in the accompanying drawings, in which—

Fig. 3 is a front elevation of the implement on a reduced scale, omitting the hose;

Fig. 4 is a front elevation of the implement, omitting one section of the air trunk, certain details being shown in section;

Fig. 5 is a sectional plan of the part 21, cut on the line V—V of Fig. 4;

Fig. 6 is a horizontal sectional detail view of one bag-coupling;

Fig. 7 is a side view of the branch shown on Fig. 5;

Fig. 8 is a top detail view of one of the said bag-couplings.

Figure 1:
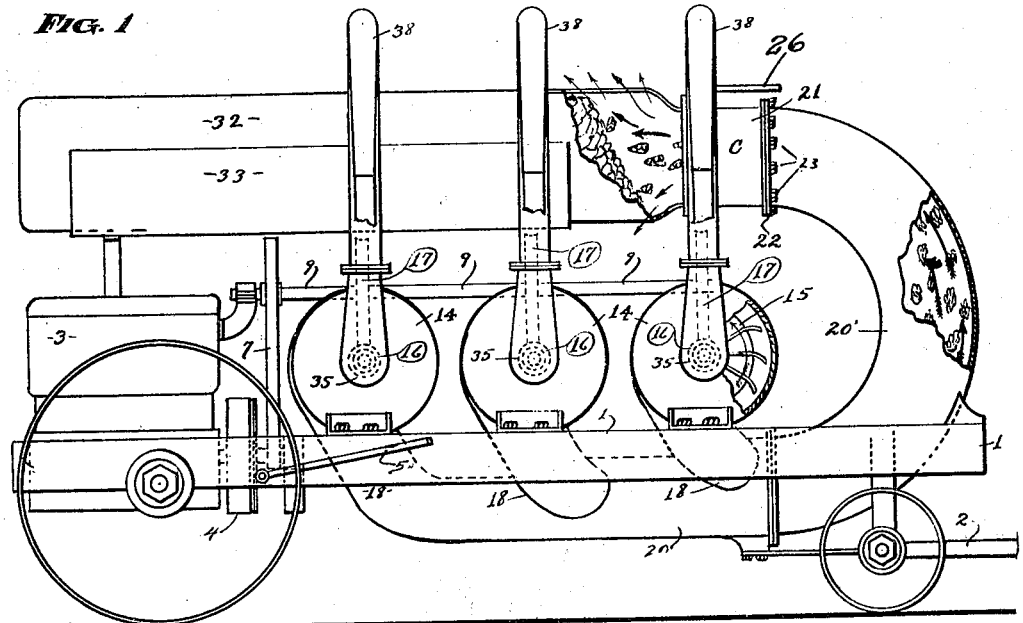
Fig. 1 is a side elevation, portions of the air-trunk being broken away.
Figure 2:
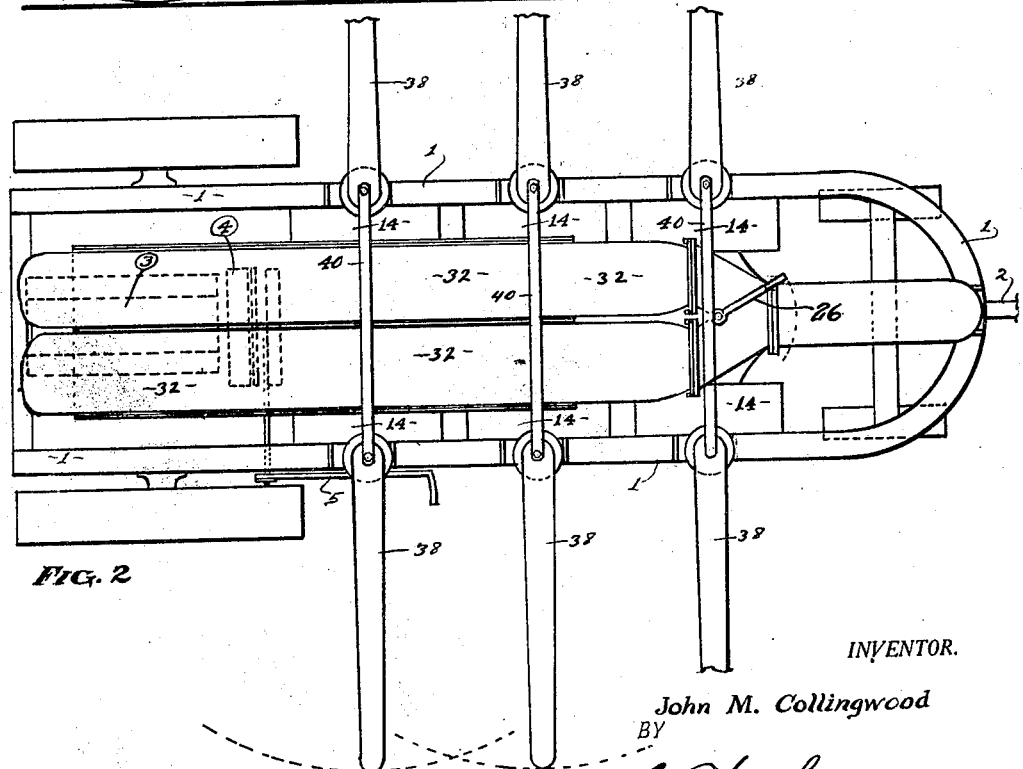
Fig. 2 is a top view, some of the arched tubes being broken away.

The wheeled frame, marked 1, is intended to be drawn by animal power, and is provided with a tongue 2 for that purpose. Mounted on this frame is an engine or motor 3, preferably of the internal-combustion type. Associated with the flywheel 4 of the motor is a friction clutch, not shown in detail, operable by a shipping lever 5. This clutch drives a small pulley 6 having belt connection 7 with a pulley 8 on a horizontal shaft 9. The front bearing 10 of said shaft is on a pedestal 12, bolted to the forward pair of fan-housings 14.

On each side of the frame 1 are, as shown, three blowers or exhaust fans, hereinafter termed fans. The rotor 15 of each fan is driven by suitable gearing from the shaft 9. In the particular drive shown on the drawings, the shafts of each pair of fans are aligned and coupled by a spiral gear or worm 16, keyed on both shafts. A spiral gear wheel 17, keyed on shaft 9, meshes with the worm, the pitch of which is such that it will be driven by the gear 17 at a sufficient velocity to maintain the necessary air-stream velocity.

A central longitudinal air trunk 20, has branches 18 connected to the respective fan-housings 14, it being thereby supported. The front section 20' extends upward, then rearward, and has a valve-box 21 secured thereto by flanges 22 and bolts 23. This valve-box provides a bifurcation of the air-trunk, and contains a wing valve 24 mounted on and actuable through a vertical shaft 25, on which is a hand lever 26. The inner end of each branch of the chamber 21 is made with a flange 27, extending around three sides of the opening but open at the top. In said flange is formed a continuous internal groove 28, adapted to receive lateral flanges 29 on a rectangular coupling-collar 30, which is connected to its valve-box by being inserted with a straight downward motion.

Two cotton-receptacles, 32, are provided, they being supported by troughs 33 which are supported in any suitable manner. The mouths of these bags are permanently attached to the collars 30 by means of a pair of loops 34, which fit over the parts as shown on Figs. 6 and 8.

Each fan 14 has an axial intake 35 extending upward and having a horizontal flange 36, to which is bolted a short vertical tube 37 having a smooth outer surface. Mounted rotatably on each tube 37 is an arched metal tube 38, having thereon a boss 39. Each pair of arched tubes are mutually braced by a tiebar 40, secured to bosses 39 with screws 41. By this device the friction between the inner end portions 38' and the tubes 37 which support them, is materially reduced, and lateral stress upon the fan-housings is eliminated.

Connected with each tube 38' is a length of air-hose 42, which should be as light as consistent with durability. Each hose is provided with a flaring nozzle 43, the outer end of which is of about the same diameter as that of the largest bolls of cotton to be picked. The several elements, intake 35, vertical tube 37, arched tube 38 comprise the induction tube described in the third paragraph of this specification.

The operation and mode of using the implement will be fully apparent from the foregoing description. All of the picker-nozzles may be used simultaneously, while the bag at either side of the vehicle is being removed, emptied, and replaced in communication with its branch of the air trunk. The cotton is drawn in turn through the arched tubes, the fan housings, and the trunk, and blown into the receptacle provided. The swiveling of the tubes to which the hose are connected, will permit a wider range of movement for each operative.

By turning the arm 26 of the valve 24, the stream of air and cotton is directed into the bag which is in position for filling, and its leakage through the aperture for the other bag is prevented.

Having now described my invention, I claim, and desire to secure by Letters Patent:

In a cotton harvesting machine, a vehicle, a plurality of exhaust fans arranged thereon in two series, one series for each side of and mounted on said vehicle; an induction tube and picker nozzle for each fan; a motor, a shaft horizontally disposed intermediate the two series of fan elements; means connecting between said motor and shaft for transmitting motor power to said shaft and means connecting between said shaft and each fan element for rotating said fan; an air trunk longitudinally arranged beneath said shaft and below said fan elements, branches connecting between said fan elements and said air trunk, said air trunk having its outer end extending first upwardly and thence again longitudinally and a forked valve box connected with the outer end of the air trunk and provided with a wing valve forming a switch in the end of the air trunk.

JOHN M. COLLINGWOOD.

Witnesses:
M. Y. CHARLES,
W. WHITTAKER.